Oct. 30, 1951      L. A. LEIFER      2,573,152

FORWARD AND REVERSE DRIVE FOR LATHE SPINDLES

Filed Sept. 13, 1948      5 Sheets-Sheet 1

INVENTOR.
Lorenz A. Leifer
BY
Andrus & Sceales
ATTORNEYS

Oct. 30, 1951  L. A. LEIFER  2,573,152
FORWARD AND REVERSE DRIVE FOR LATHE SPINDLES
Filed Sept. 13, 1948  5 Sheets-Sheet 3

INVENTOR.
Lorenz A. Leifer
BY
Andrus & Scales
ATTORNEYS.

Oct. 30, 1951 L. A. LEIFER 2,573,152
FORWARD AND REVERSE DRIVE FOR LATHE SPINDLES
Filed Sept. 13, 1948 5 Sheets-Sheet 4
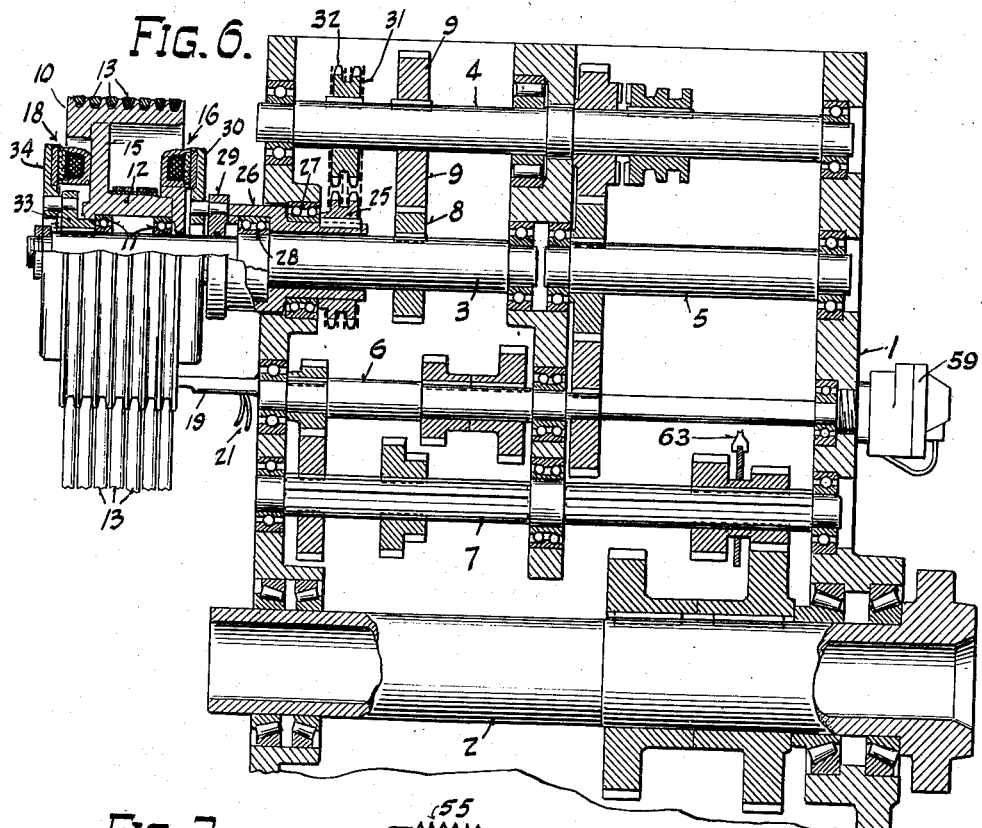
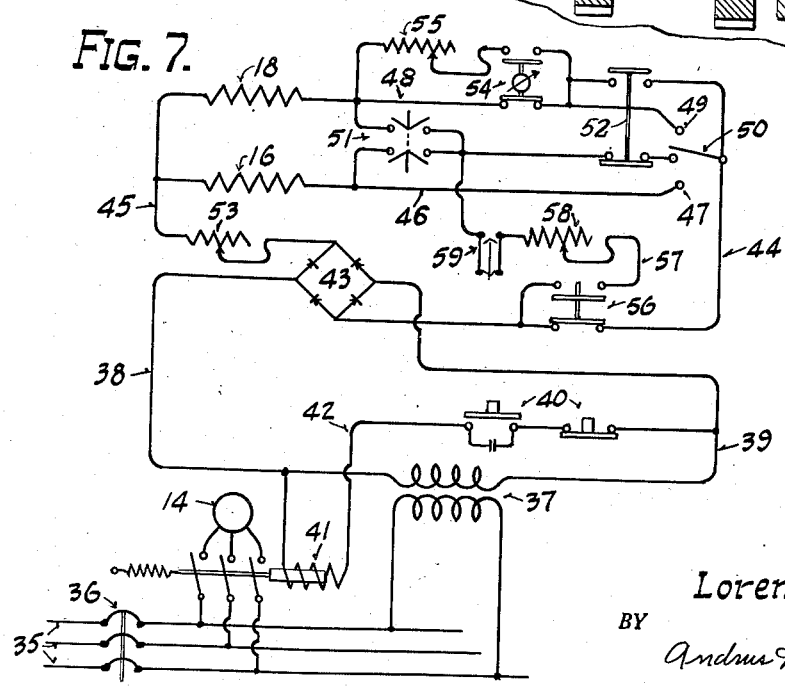
INVENTOR.
Lorenz A. Leifer
BY
Andrus & Sceales
ATTORNEYS.

Oct. 30, 1951  L. A. LEIFER  2,573,152
FORWARD AND REVERSE DRIVE FOR LATHE SPINDLES
Filed Sept. 13, 1948  5 Sheets-Sheet 5

INVENTOR.
Lorenz A. Leifer
BY Andrus & Sceales
ATTORNEYS.

Patented Oct. 30, 1951

2,573,152

UNITED STATES PATENT OFFICE 2,573,152

FORWARD AND REVERSE DRIVE FOR LATHE SPINDLES

Lorenz Albert Leifer, Madison, Wis., assignor to Gisholt Machine Company, Madison, Wis., a corporation of Wisconsin Application September 13, 1948, Serial No. 49,097

7 Claims. (Cl. 192—4)

This invention relates to a forward and reverse drive for lathe spindles.

One of the principal objects of the invention is to provide a more effective forward and reverse drive wherein either drive is employed as a brake for the other to obtain greater braking action.

Another object of the invention is to provide a cushioned torque drive in either direction, and with the same mechanism to similarly provide a cushioned brake.

Another object is to provide an automatic brake operable upon release of the drive in either direction.

Another object is to increase the operating speed for shifting between cycles so that the overall production of the lathe is increased.

Another object is to simplify the control of the spindle and to electrify the same so that manual operator fatigue is reduced.

Another object is to provide for the proper gear speed during shifting operations without loss of time, thereby providing for faster shifting of headstock gears.

The invention is illustrated in the embodiment shown in the accompanying drawings in which:

Fig. 6 is a schematic section of the entire headstock drive taken axially of the several shafts;

Fig. 7 is a wiring diagram of the control for the drive; and

Figure 1:
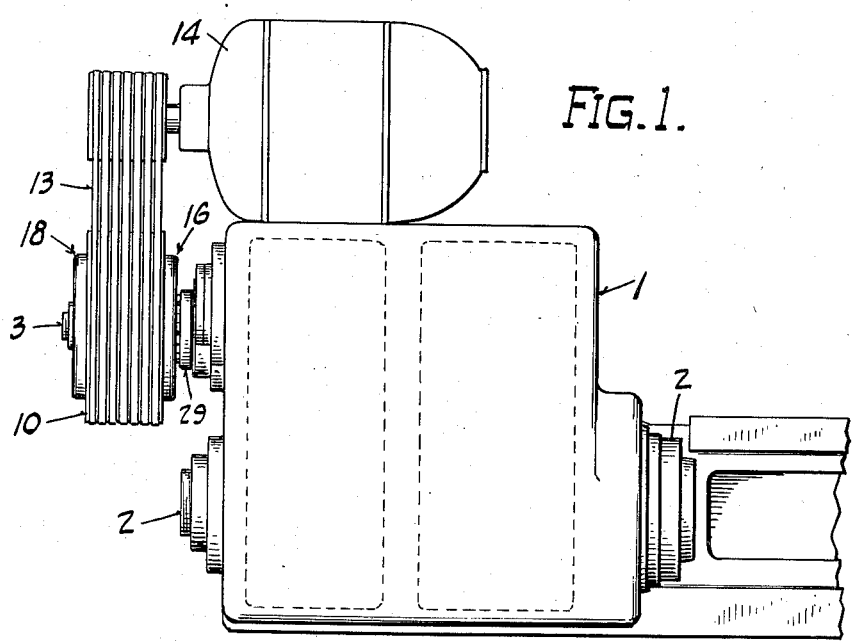
Figure 1 is a top plan view of the lathe headstock.
Figure 2:
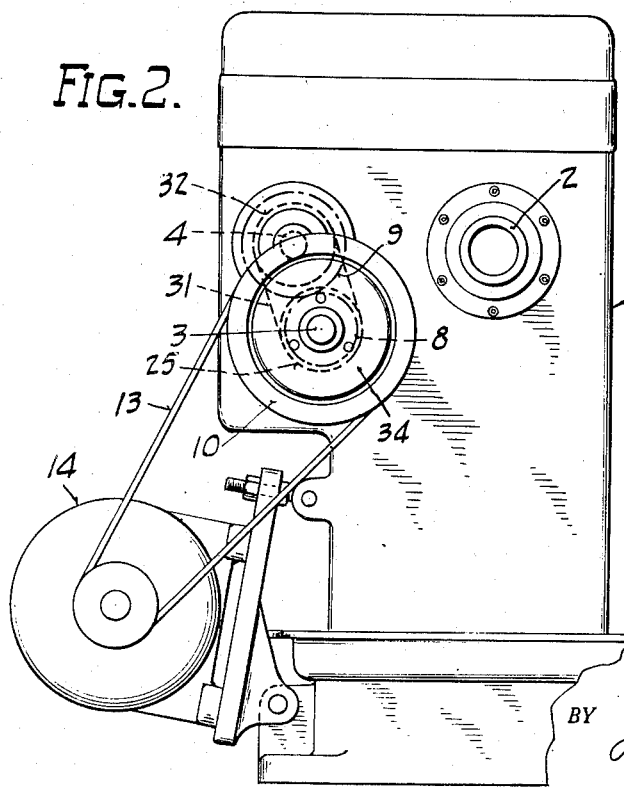
Fig. 2 is a rear end elevation of the head stock with parts of the drive broken away and sectioned.

The lathe illustrated has the usual bed with a headstock 1 at one end thereof.

The headstock 1 carries a spindle 2 journaled for rotation therein and extending parallel to the bed, and a drive shaft 3 also journaled for rotation therein and disposed parallel to spindle 2.

Intermediate shafts 4, 5, 6 and 7 serve to complete the drive connection between drive shaft 3 and spindle 2, and each carries gearing which may be shifted or clutched into operation to provide the desired overall speed ratio for the drive of the spindle.

The shaft 3 is geared to shaft 4 by the gears 8 and 9 secured to the corresponding shafts and which compel the shafts to rotate in opposite directions at all times when either is in rotation.

A multiple V-belt sheave 10 is mounted for free rotation on the rear end of drive shaft 3 by means of the ball bearings 11 disposed between the hub 12 and the shaft.

A belt 13 drives sheave 10 from an electric power motor 14 mounted on the headstock and base.

The drive sheave 10 is constructed with a belt engaging rim of substantial diameter secured by a web 15 to the cylindrical hub 12 to provide a substantial radial space between the rim and hub on the inside of the web.

Hub 12 has an electro-magnet clutch element 16 secured thereto at its inner end opposite web 15 and two separate pairs of collector rings 17 encircling the hub between the magnet 16 and web 15.

Web 15 similarly has an electro-magnet clutch element 18 secured thereto on the outer side thereof and facing in the opposite direction from magnet 16.

The rear wall of headstock 1 carries a bracket 19 extending into the space generally bounded by the sheave rim, web 15, hub 12 and magnet 16, and which carries suitable contact brushes 20 in engagement with the corresponding collector rings 17 to supply current to the magnets 16 and 18. Leads 21 extend through bracket 19 to brushes 20, and leads 22 extend from the inner pair of rings 17 to magnet 16 and leads 23 extend from the outer pair of rings 17 through an opening 24 in web 15 to magnet 18.

The magnetic clutch elements 16 and 18 rotate with drive sheave 10 and the inner element 16 is disposed to drive a sprocket 25 rotatable freely on shaft 3 and which in turn drives the shaft 4 in one direction, and the outer element 18 is disposed to drive shaft 3 which is geared to drive shaft 4 in the opposite direction.

For this purpose, sprocket 25 is disposed inside headstock 1 and has a hub 26 extending outwardly through a ball bearing 27 in the rear wall of the headstock. Hub 26 in turn supports the rear end of shaft 3 by means of ball bearings 28 which provide for free rotation of shaft 3 in the hub.

An end plate 29 is secured to the outer end of hub 26 and carries a clutch plate 30 facing magnet clutch element 16. Clutch plate 30 serves as an armature for the magnet 16 and is adapted to be frictionally gripped thereby when the magnet is energized and to be free to rotate independently thereof when the magnet is not energized.

The sprocket 25 carries a chain 31 which drives a corresponding sprocket 32 keyed to the shaft 4. Whenever the shaft 4 rotates, the sprocket 25 and its clutch plate 30 must also rotate.

The outer end of shaft 3 carries a hub section 33 keyed thereto and which in turn has a clutch plate 34 secured thereto and facing magnetic clutch element 18. Clutch plate 34 serves as an armature for the magnet 18 and is adapted to be gripped frictionally thereby when the magnet is energized and to be free to rotate independently thereof when the magnet is not energized.

When clutch element 16 is energized the sprocket 25 drives shaft 4 in a direction generally effecting a reverse drive for spindle 2; and at the same time the shaft 3 is driven by gearing 8—9 in a direction opposite to the direction of rotation of sheave 10 so that clutch plate 34 will rotate in the opposite direction to that of clutch element 18 and the differential speed therebetween will be approximately double the speed of sheave 10 depending upon the ratio of gears 8 and 9 and of sprockets 25 and 32.

When clutch element 18 is energized shaft 3 will drive shaft 4 through gearing 8—9 in a direction generally corresponding to a forward drive for spindle 2; and at the same time chain 31 will drive sprocket hub 26 and clutch plate 30 in a direction opposite to that of sheave 10, so that the differential speed between plate 30 and sheave 10 will be approximately double the speed of sheave 10 depending upon the ratio of gears 8 and 9 and of sprockets 25 and 32.

In each instance referred to in the last two paragraphs above, the idling clutch is adapted to serve as a brake for stopping the spindle, and the fact that its clutching elements are rotating in opposite directions to provide a high differential in speed makes the braking action more effective than would be the case if the brake operated directly upon the shaft 3 from the head stock.

The clutches may be used to provide an adjustable torque wrench particularly for tightening threaded members such as adjustable valve seats and the like where it is possible to utilize the lathe for the threading operation.

The clutches may also be used to reduce the drive speed for facilitating the shifting of gears in the head stock.

The wiring diagram in Fig. 7 provides for the various controls required. In the diagram the drive motor 14 receives its power from three phase supply lines 35 to which it is connected by the circuit breaker 36.

A transformer 37 has its primary connected to opposite lines 35 and its secondary supplying a suitable voltage to the control circuits through leads 38 and 39.

The main control switch 40 for starting and stopping motor 14 is connected in series with the solenoids 41 in a lead 42 connecting leads 38 and 39. When switch 40 is closed solenoids 41 close the magnetic starter for starting motor 14. Opening of switch 40 de-energizes solenoids 41 and permits the magnetic starter to disconnect motor 14 from lines 35.

A rectifier 43 is connected across lead lines 38—39 to supply direct current for operation of clutch magnets 16 and 18.

The output leads 44 and 45 of rectifier 43 supply direct current to magnet 16 through cross lead 46 which connects the magnet in series with a control switch 47.

The output leads 44 and 45 of rectifier 43 supply direct current to magnet 18 through cross lead 48 which connects the magnet in series with a control switch 49.

Control switches 47 and 49 are operated by a single rotary control arm 50 which has a neutral stop position intermediate the opposite switch closing positions. Upon opening either switch 47 or 49 arm 50 passes to the stop position wherein it connects a zero speed switch 51 disposed to energize the opposite clutch magnet for braking the spindle rotation until the spindle stops.

Figure 3:
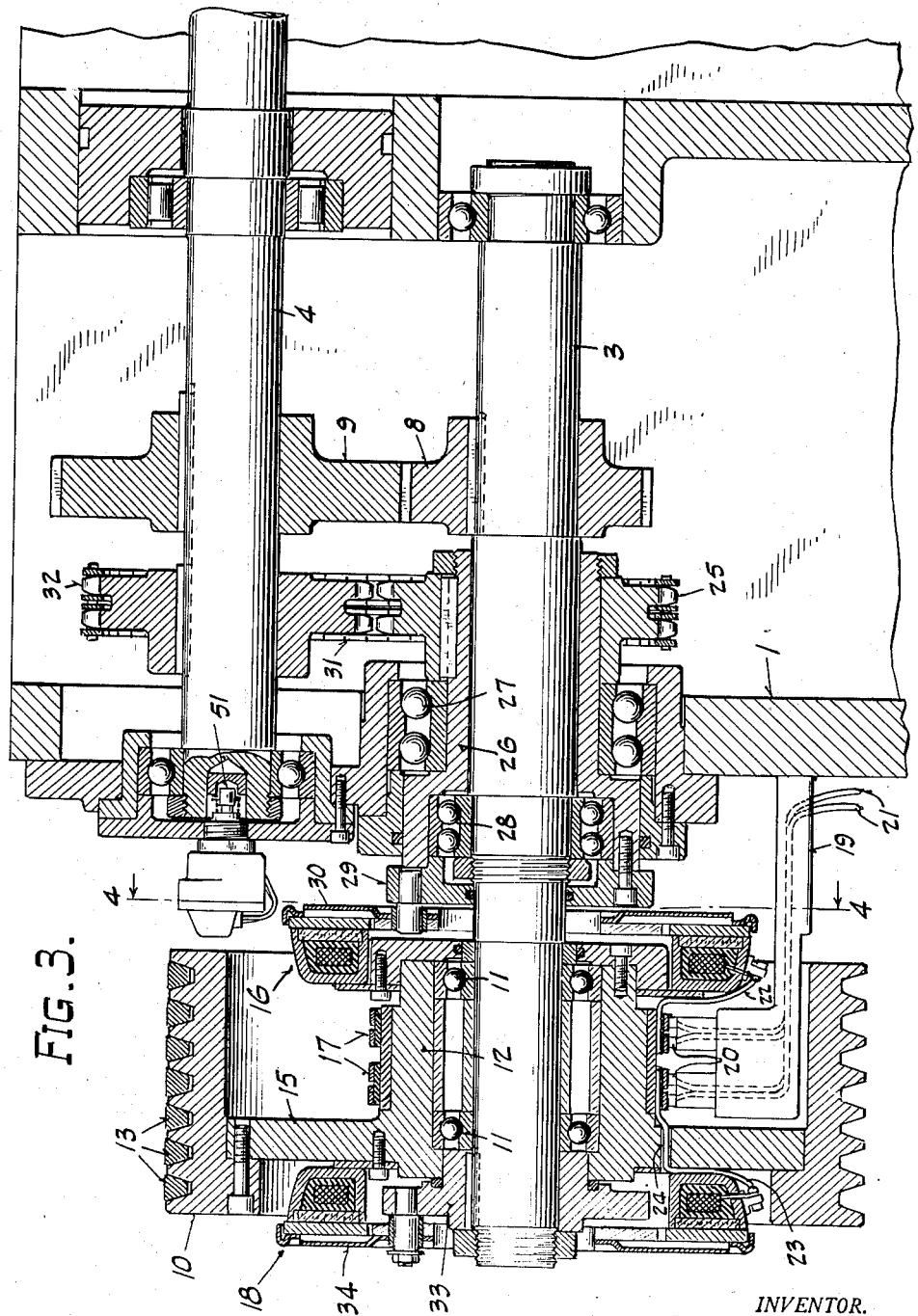
Fig. 3 is a section taken axially of the main drive shaft and a shaft driven thereby.
Figure 4:
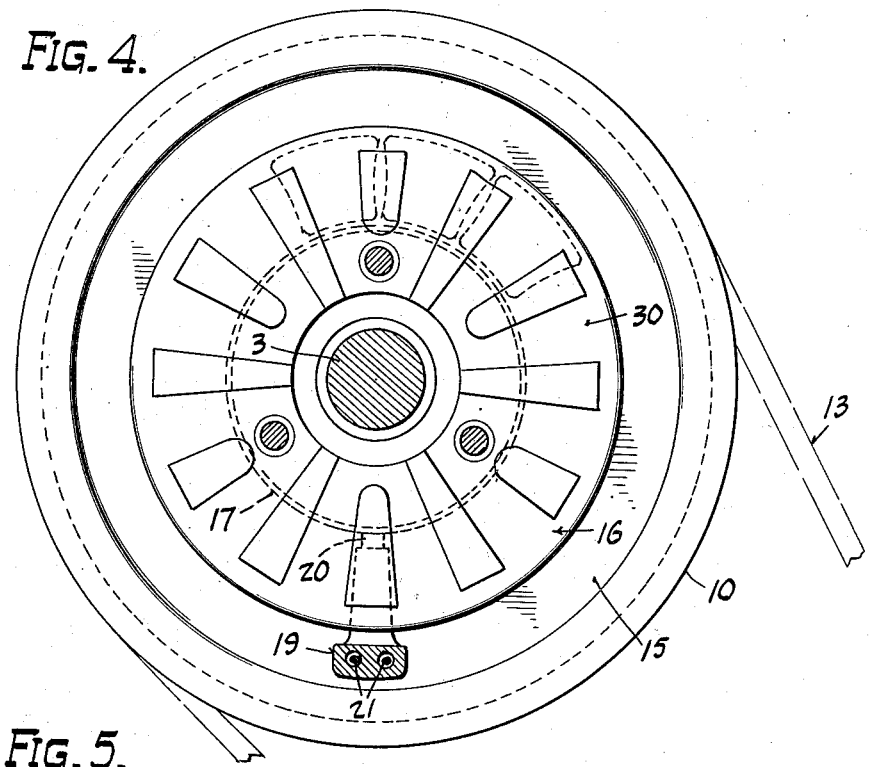
Fig. 4 is a transverse vertical section taken on line 4—4 of Fig. 3 and showing the reverse clutch in end elevation with parts broken away.
Figure 5:
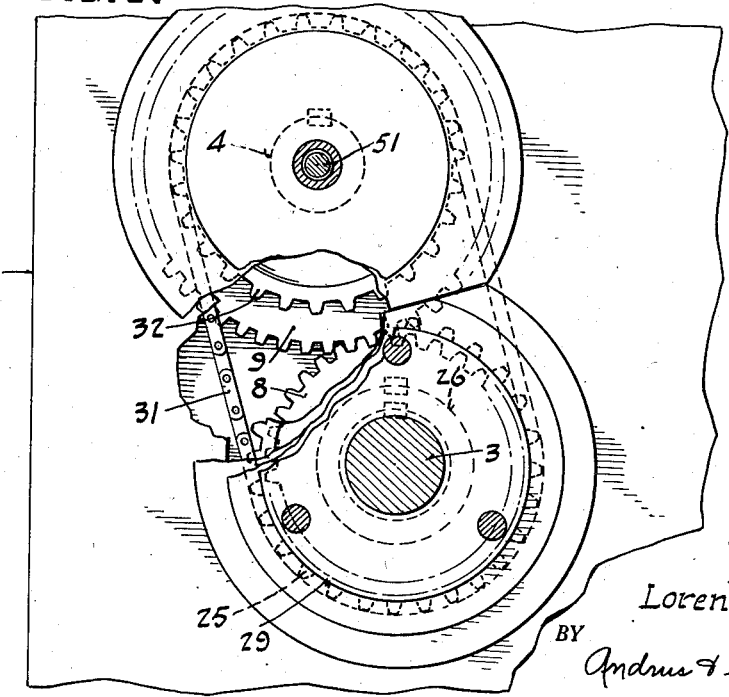
Fig. 5 is a section taken in the opposite direction from Fig. 4 on line 4—4 of Fig. 3 showing the reverse drive hub in end elevation with parts broken away and sectioned.

Zero speed switch 51 is disposed in the rear end of shaft 4 (Fig. 3) and is governed by the rotation of the shaft to provide a braking action by energizing the clutch drive opposite to its then direction of rotation until such time as the spindle speed becomes substantially zero or a predetermined low speed. The switch has separate contacts for forward and reverse rotation of the shaft and the corresponding contacts are maintained closed by the switch during rotation of the shaft.

The braking action is therefore automatic upon turning of switch arm 50 to open the circuit of the magnet clutch that is driving the spindle.

As soon as the spindle stops the brake circuit is opened and there is no further braking action on the spindle, so that it can be turned freely if desired.

Where is is desired to inch the spindle forwardly slowly, to position it relative to the work or a tool, as in setting up, a push button switch 52 is connected in a shunt to switch 49 and which may provide full energization of magnet clutch 18. Switch 52 is connected to a cut-out switch in the circuit of zero speed switch 51 so that switch 51 does not energize the opposite clutch drive to provide a braking action when inching.

The energization of clutches 16 and 18 may be varied by inserting an adjustable resistor 53 in the return lead 45 between the magnets 16 and 18 and the rectifier 43.

A manually controllable torque adjustment may be provided when it is desired to utilize the spindle as a torque wrench. For this purpose, the inching circuit contains a two-way switch 54 adapted to cut in and out of the circuit a variable resistance 55 which is set to provide the desired torque to be applied to spindle 2.

The switch 54 has two positions: one known as the "run" position in which resistance 55 is shunted and the spindle speed is therefore at a maximum, and the other known as the "seat" position in which resistance 55 is connected in the circuit for clutch 18 thereby reducing the torque available on spindle 2 to a predetermined amount for tightening threads and the like.

Where the lathe spindle operates at high speeds it will be desirable to reduce the speed for shifting headstock gears without stopping the spindle altogether. For this purpose, lead line 44 from rectifier 43 contains a two-way cut-out switch 56 which may be made operable by hydraulic fluid pressure from a pressure line leading to a headstock shifter mechanism, or by other suitable means of actuating the shifter mechanism, so that when hydraulic pressure or such other suitable means is applied to effect a predetermined shifting of gears, switch 56 will automatically disconnect the magnet 18 and will connect the zero speed switch 51 in the rectifier output circuit through a line 57 leading from switch 56 to switch 51. A variable resistance 58 is connected in line 57 to provide a means of correlating the brake action obtained through zero speed switch 51 and the time lag effective in the shifting mechanism. If desired, a supplemental throw-out switch 59 may be operated in line 57 by the centrifugal action of shaft 6, in much the same manner as switch 51 is made responsive to the action of shaft 4, whereby the braking action is terminated at a predetermined rotary speed for the shaft, leaving the latter free for gear shifting purposes. Upon completion of the shifting operation the hydraulic pressure operating switch 56 is reduced and the switch returns to its normal position opening the brake circuit and closing the drive clutch circuit.

As stated above, braking action for obtaining a safe shifting speed effected by switches 56 and 51, the termination by switch 59 of such braking action when proper shifting speed has been reached, and the return to operating speed effected when switch 56 closes after shifting is completed are obtained by causing switch 56 to be responsive to hydraulic or other shifting mechanism for the headstock variable speed transmission, and by causing switch 59 to be responsive to a certain speed reduction of one of the shafts of that transmission.

Figure 8:
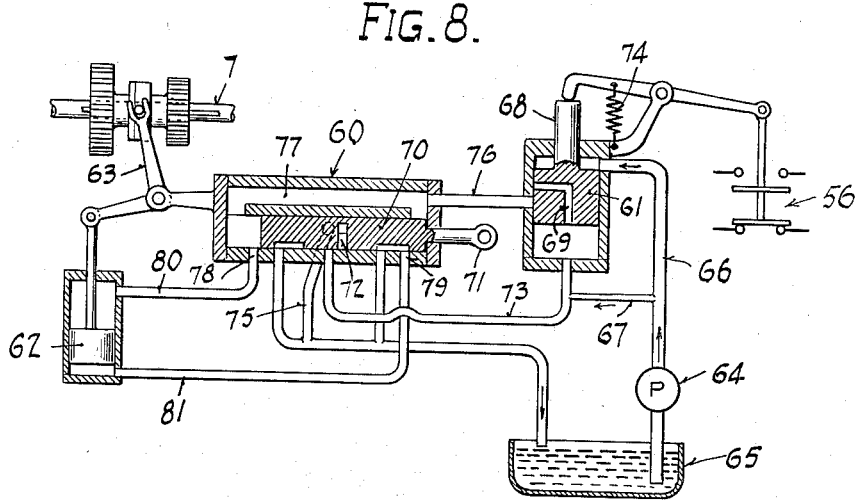
Fig. 8 is a schematic illustration of the gear shifting mechanism and control means therefor.

As illustrated in Fig. 8, the hydraulic shifting mechanism may comprise a lever operated valve assembly 60, a delayed-action fluid supply valve 61, a hydraulically activated shifter piston 62, and a shifting lever 63 responsive to action of piston 62 and pivoted in the headstock to cause shifting of the gears on shaft 7. A pump 64 supplies fluid to the system from a sump 65.

Fluid supply valve 61 is mounted for reciprocating movement in a cylinder, each end of which is continuously supplied fluid under pressure from pump 64 through inlet lines 66 and 67. A stem 68 extends from valve 61 to without its cylinder, said stem obstructing area at one end of the valve 61 thereby causing fluid admitted through inlet line 67 to be applied to a slightly greater working area on the valve than the fluid applied through line 66. As a result valve 61 is normally disposed in an upward position as shown in Fig. 8.

Fluid from line 67 may enter a passage 69 disposed internally of valve 61.

Control valve assembly 60 contains a barrel valve 70 which may be moved by a hand lever 71 to either of two operating positions determined by the extremities of lengthwise movement permitted valve 70 in the body of assembly 60.

The body of valve assembly 60 is formed with a passage 72 extending through the same and communicating with the bore in which valve 70 moves. A transverse passageway is formed in valve 70 and disposed to be aligned with the assembly body passage 72 momentarily as valve 70 moves from one to the other of its operating positions. However, when such an operating position is reached the valve 70 once again obstructs passage 72.

Passage 72 and the chamber below supply valve 61 are connected by a bleeder lead 73 disposed to drain the chamber through operating valve passage 72 whenever operating valve 70 moves between operating positions.

Switch 56, previously described as adapted to cause braking of the transmission prior to shifting, is mounted adjacent supply valve 61, being urged to an open position by a spring 74. However, in the position of valve 61 shown in Fig. 8, the switch 56 is held closed by valve stem 68 acting in opposition to spring 74.

When a speed reduction is desired prior to shifting, control valve 70 is manually moved to initiate said shifting and fluid below valve 61 is bled through line 73, passage 72 in valve 70, and a bleeder return lead connected with sump 65. The bleeding action causes valve 61 to be rapidly forced downwardly to its lowermost position and switch 56 is opened to initiate speed reduction.

The bleeding action is only momentarily permitted by valve 70 and fluid is reintroduced below valve 61 by line 67 at which time valve 61 slowly begins to raise due to the slight mechanical advantage of the fluid below the valve as compared with the fluid supplied from line 66 which acts upon a smaller surface.

After a predetermined delay permitting a suitable speed reduction, the internal passage 69 of valve 61 is raised to a level permitting its communication with a fluid line 76 leading to a chamber 77 provided in control valve assembly 60. Fluid flowing to the chamber 77 is admitted by valve 70 to one of outlet ports 78 and 79 which communicate through leads 80 and 81, respectively, to opposite sides of shifter piston 62, thereby shifting the gears on shaft 7 while switch 56 remains in open position. When supply valve 61 has reached the top of its stroke the switch 56 is reopened, the shifting operation having then been completed, and at a time when resumption of operating speed is desired.

The amount of desired speed reduction occurring during the time switch 56 remains open is controlled by switch 59 (Figs. 6 and 7) carried by transmission shaft 6 and responsive to a certain shaft speed to limit the braking action otherwise effected by open switch 56.

With the clutch opposite from the one that is in engagement having a great deal higher relative rotative speeds than in the usual drive, the drives of the invention effect a reversal of spindle rotation in a considerably less time than the usual drives and yet the actuation is smooth and without shock. Operations therefore can be very closely controlled.

Various embodiments of the invention may be employed within the scope of the accompanying claims.

I claim:

1. In a lathe headstock, a drive sheave, power means to drive said sheave, a driven shaft, a pair of rotary drive means coupled with said driven shaft to drive the same in opposite directions whereby rotation of said driven shaft by one of said drive means effects idling rotation of the opposite drive means in a direction opposite to that of said operative drive means, an electro-magnetic clutch disposed between said drive sheave and each of said rotary drive means to provide for the selective driving of said driven shaft in either forward or reverse direction, means connecting said clutches to a source of electricity to energize said clutches alternately under manual selection to drive and brake the driven shaft and to de-energize the clutch serving as a brake automatically upon braking of the speed of said driven shaft to zero, a spindle, a change speed transmission disposed between said driven shaft and spindle to drive the latter, a switch in the circuit connections for said clutches disposed to disconnect the driving clutch in any instance and energize the clutch serving as a brake for reducing the speed of said transmission to a safe speed for shifting the same, and means for operating said switch in correlation to the shifting of the transmission to automatically cause the stated reduction in transmission speed.

2. In a lathe headstock, a drive sheave, power means to drive said sheave, a driven shaft, a pair of rotary drive means coupled with said driven shaft to drive the same in opposite directions whereby rotation of said driven shaft by one of said drive means effects idling rotation of the opposite drive means in a direction opposite to that of said operative drive means, an electro-magnetic clutch disposed between said drive sheave and each of said rotary drive means to provide for the selective driving of said driven shaft in either forward or reverse direction, means connecting said clutches to a source of electricity to energize said clutches alternately under manual selection to drive and brake the driven shaft and to de-energize the clutch serving as a brake automatically upon braking of the speed of said driven shaft to zero, a spindle, a change speed transmission disposed between said driven shaft and spindle to drive the latter, a switch in the circuit connections for said clutches disposed to disconnect the driving clutch in any instance and energize the clutch serving as a brake for reducing the speed of said transmission to a safe speed for shifting the same, means for operating said switch in correlation to the shifting of the said transmission to automatically cause the stated reduction in transmission speed, and a switch in series with said first named switch and operable in correlation to the speed of said transmission to cut out said braking and resulting reduction of speed automatically just prior to shifting of said transmission, said first named switch serving to reconnect the drive clutch upon completion of the shifting operation.

3. In a lathe headstock, a drive sheave, power means to drive said sheave, a driven shaft, a pair of rotary drive means coupled with said driven shaft to drive the same in opposite directions whereby rotation of said driven shaft by one of said drive means effects idling rotation of the opposite drive means in a direction opposite to that of said operative drive means, an electro-magnetic clutch disposed between said drive sheave and each of said rotary drive means to provide for the selective driving of said driven shaft in either forward or reverse direction, a source of electricity for energizing said electro-magnetic clutches, circuit connections between said source and each clutch, a switch operable selectively to close the circuit of either clutch only when the circuit of the other clutch is open, a second circuit connecting said clutches to said source, a second switch connected in said second circuit and disposed to energize the idling clutch upon closure of said second circuit and to de-energize said clutch upon a predetermined reduction in speed of said driven shaft, centrifugal means for operating said second named switch in correlation to the rotation of said driven shaft whereby the de-energization of the clutch upon reduction in speed of said shaft is automatic, a spindle, a change speed transmission disposed between said driven shaft and spindle to drive the latter, a third switch disposed to open the circuit of the driving clutch and to close said second named circuit for energizing the idling clutch prior to the shifting operation, and means for operating said third switch in correlation to a shifting of said transmission so that its opening and closing actions are automatic, said second named switch being set to open said second circuit upon a reduction in speed of said transmission to a suitable speed for shifting, and said third named switch being automatically operated upon completion of the shifting to open said second circuit and to close the circuit for the drive clutch.

4. In combination in a lathe, a drive sheave, power means to drive said sheave, a driven shaft, a spindle, a change speed transmission driving said spindle from said driven shaft, a pair of rotary drive means disposed to drive said driven shaft in opposite directions whereby rotation of said driven shaft by one of said drive means effects idling rotation of the opposite drive means in a direction opposite to that of said operative drive means, an electro-magnetic clutch disposed between said drive sheave and each of said rotary drive means to provide for the selective driving of said driven shaft in either forward or reverse direction, means connecting said clutches to a source of electricity to energize said clutches alternately under manual selection to drive the driven shaft in either direction or to reduce the speed of said shaft in a given direction by utilizing a clutch as a brake, switch means in the circuit connections for said clutches disposed to disconnect the driving clutch in any instance and energize the clutch serving as a brake for reducing the speed of said transmission to a safe speed for shifting the same, and a switch in the circuit connection of said braking clutch and responsive to the speed of said transmission and adapted to automatically de-energize the clutch serving as a brake when a predetermined safe shifting speed has been attained by braking action initiated by said first named switch means.

5. In combination in a lathe, a drive sheave, power means to drive said sheave, a driven shaft, a spindle, a change speed transmission driving said spindle from said driven shaft, a pair of rotary drive means disposed to drive said driven shaft in opposite directions whereby rotation of said driven shaft by one of said drive means effects idling rotation of the opposite drive means in a direction opposite to that of said operative drive means, an electro-magnetic clutch disposed between said drive sheave and each of said rotary drive means to provide for the selective driving of said driven shaft in either forward or reverse direction, means connecting said clutches to a source of electricity to energize said clutches alternately under manual selection to drive the driven shaft in either direction or to reduce the speed of said shaft in a given direction by utilizing a clutch as a brake, switch means in the circuit connections for said clutches disposed to disconnect the driving clutch in any instance and energize the clutch serving as a brake for reducing the speed of said transmission to a safe speed for shifting the same, and a switch in the circuit of said braking clutch and responsive to the speed of said transmission and adapted to automatically de-energize the clutch serving as a brake when a predetermined safe shifting speed has been attained by braking action initiated by said first named switch means, said first named switch means being adapted to automatically reconnect said driving clutch upon completion of the shifting operation.

6. In combination in a lathe, a drive sheave, power means to drive said sheave, a driven shaft, a spindle, a change speed transmission driving said spindle from said driven shaft, a pair of rotary drive means disposed to drive said driven shaft in opposite directions whereby rotation of said driven shaft by one of said drive means effects idling rotation of the opposite drive means in a direction opposite to that of said operative drive means, an electro-magnetic clutch disposed between said drive sheave and each of said rotary drive means to provide for the selective driving of said driven shaft in either forward or reverse direction, means connecting said clutches to a source of electricity to energize said clutches alternately under manual selection to drive the driven shaft in either direction or to reduce the speed of said shaft in a given direction by utilizing a clutch as a brake, switch means in the circuit connections for said clutches disposed to disconnect the driving clutch in any instance and energize the clutch serving as a brake for reducing the speed of said transmission to a safe speed for shifting the same, a switch in the circuit of said braking clutch and responsive to the speed of said transmission and adapted to automatically de-energize the clutch serving as a brake when a predetermined safe shifting speed has been attained by braking action initiated by said first named switch means, and means for shifting said transmission, said first named switch means being responsive to the action of said shifting means to automatically reconnect said driving clutch upon completion of the shifting operation.

7. In combination in a lathe, a drive sheave, power means to drive said sheave, a driven shaft, a spindle, a change speed transmission driving said spindle from said driven shaft, a pair of rotary drive means disposed to drive said driven shaft in opposite directions whereby rotation of said driven shaft by one of said drive means effects idling rotation of the opposite drive means in a direction opposite to that of said operative drive means, an electro-magnetic clutch disposed between said drive sheave and each of said rotary drive means to provide for the selective driving of said driven shaft in either forward or reverse direction, means connecting said clutches to a source of electricity to energize said clutches alternately under manual selection to drive the driven shaft in either direction or to reduce the speed of said shaft in a given direction by utilizing a clutch as a brake, switch means in the circuit connections for said clutches disposed to disconnect the driving clutch in any instance and energize the clutch serving as a brake for reducing the speed of said transmission to a safe speed for shifting the same, a switch in the circuit of said braking clutch and responsive to the speed of said transmission and adapted to automatically de-energize the clutch serving as a brake when a predetermined safe shifting speed has been attained by braking action initiated by said first named switch means, and means for shifting said transmission, said first named switch means being responsive to the action of said shifting means to automatically effect braking to a safe speed and reconnection of said driving clutch upon completion of the shifting operation.

LORENZ ALBERT LEIFER.

REFERENCES CITED

The following references are of record in the file of this patent:

UNITED STATES PATENTS

| Number | Name | Date |
| --- | --- | --- |
| 597,435 | Rogers | Jan. 18, 1898 |
| 934,104 | Steckel | Sept. 14, 1909 |
| 1,136,279 | Severy | Apr. 20, 1915 |
| 1,524,855 | Butterfield | Feb. 3, 1925 |
| 1,846,894 | Morgan | Feb. 23, 1932 |
| 2,493,299 | LeBlond | Jan. 3, 1950 |